Figure 1:
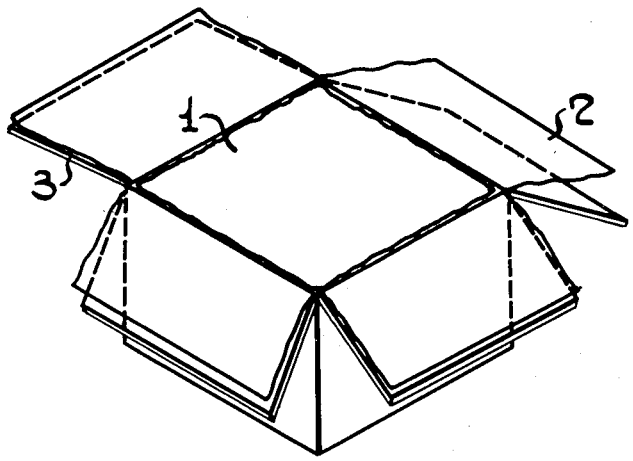

Oct. 30, 1951  W. J. SPARKS ET AL  2,572,959
PACKAGING TACKY ISOBUTYLENE-DIOLEFIN RUBBER IN FILM
OF COMPATIBLE STYRENE-ISOBUTYLENE COPOLYMER
Filed March 24, 1945

William J. Sparks
Francis P. Baldwin  Inventors
Raymond G. Newberg
By *[signature]* Attorney Patented Oct. 30, 1951

2,572,959

UNITED STATES PATENT OFFICE 2,572,959

PACKAGING TACKY ISOBUTYLENE-DIOLEFIN RUBBER IN FILM OF COMPATIBLE STYRENE-ISOBUTYLENE COPOLYMER

William J. Sparks, Cranford, Francis P. Baldwin, Rahway, and Raymond G. Newberg, Cranford, N. J., assignors to Standard Oil Development Company, a corporation of Delaware Application March 24, 1945, Serial No. 584,622

5 Claims. (Cl. 206—84)

This invention relates to a new article of manufacture and methods of making same, and more particularly, it relates to novel and improved methods of packaging plastic materials which are tacky and have substantial cold-flowing tendencies. One particularly important application of the invention is in packaging the synthetic rubber known as "butyl" rubber made by the low-temperature copolymerization of isobutylene with a small amount of a diolefin.

The synthetic rubber referred to above as "butyl" rubber may be prepared as described in Australian Patent 112,875 or U. S. Patent 2,356,128, and is the type of synthetic rubber manufactured under war emergency government contracts under the identification GRI.

Although the details of the preparation of such synthetic rubber do not constitute a part of this invention, it may be noted for the sake of general reference, that such preparation comprises essentially reacting together isobutylene with a low molecular weight aliphatic conjugated diolefin such as isoprene or butadiene, in the presence of a dissolved metal halide Friedel-Crafts catalyst at a temperature below −50° C. A preferred catalyst is made by dissolving aluminum chloride in ethyl chloride at room temperature and then cooling the solution down to the desired copolymerization temperature. The reaction is preferably carried out in the presence of a diluent-refrigerant such as liquid ethylene, and preferably at a temperature ranging from about −80° C. to −103° C., the boiling point of liquid ethylene. The proportions of reactants may vary to some extent, chiefly according to the type of diolefin used; for instance, the proportion of isobutylene should be about 70 to 99.5% by weight and the amount of diolefin should be about 0.5 to 30%, or more specifically 5 to 30% in the case of butadiene or about 0.5% to 10% in the case of isoprene.

The synthetic rubber produced by the above described process is an elastic branched chain linear aliphatic hydrocarbon copolymer having a molecular weight ranging from about 10,000 upward to 100,000 or more and having a slight unsaturation indicated by an iodine number ranging from about 1 to 20, preferably about 2 to 10, and convertible with sulfur or other suitable vulcanizing or curing agent into a product of decreased plasticity, increased elasticity and tensile strength. In the cured or vulcanized condition, this synthetic rubber has no undesirable tacky or cold-flowing properties, but a serious problem is presented to the rubber industry by the necessity of packaging the raw (i. e., unvulcanized) rubber for shipment from the manufacturing plant to the factories where the raw synthetic rubber is to be compounded with curing agents and other materials as desired, shaped into the desired articles such as inner tubes for tires for autos, airplanes, etc., and then vulcanized.

Because of the tackiness of this raw synthetic rubber stock, it sticks to any of the conventional packaging materials such as paper bags, cardboard boxes or metal containers, in fact so tightly that its removal from such containers requires very time-consuming, drastic procedures. This tackiness problem is particularly serious with raw synthetic rubber of the type described having a Mooney number between approximate limits of 10 to 50, which may be considered as roughly equivalent to a molecular weight of about 15,000 or 17,000 to about 50,000. The Mooney test is applied by heating the plastic material in question to 100° C., subjecting it to pressure and measuring the resistance to flow or deformation, the higher the Mooney number, the tougher the material. It should be noted that the GRI specification calls for a Mooney number of 40 to 50.

One object of the present invention is to package this synthetic rubber and other tacky materials with a film of wrapping material which will prevent the tacky material from sticking to the paper or metal container in which it is stored or shipped. Another object of the invention is to provide a packaging material which is physically and chemically compatible with the synthetic rubber or other tacky wrapped material so that after storage and shipment, or at any desired time, the wrapper film which is used to prevent the tacky material from sticking to the outer container may be homogeneously mixed into the synthetic rubber or other tacky material without deleteriously affecting the desirable properties of the latter. These and other objects and advantages of the invention will be apparent to those skilled in the art from the following specification, particularly when read in conjunction with the accompanying drawing.

Broadly, the invention comprises wrapping the unvulcanized synthetic rubber or other tacky material in a thin, flexible, continuous, self-sustaining sheet or film of a substance capable of forming a homogeneous mixture therewith.

One suitable wrapping material is a synthetic copolymer of an aliphatic olefin such as isobutylene and a polymerizable cyclic compound such as styrene.

A general method of preparing such copolymers is described in U. S. Patent 2,274,749, and this consists in copolymerizing the reactants at a temperature below 0° C. in the presence of an active halide polymerization catalyst such as boron fluoride or aluminum chloride, with or without the use of a diluent-refrigerant such as liquid propane etc., and using proportions of reactants which may vary over a broad range according to desired hardness, melting point, plasticity, etc. However, for the particular purposes of the present invention, this copolymer must be prepared under certain relatively narrow conditions. The proportion of aliphatic olefin such as isobutylene used in the copolymerization should be about 40 to 70% by weight, preferably about 45 to 60% by weight, while the proportion of polymerizable cyclic compound such as styrene, should be about 35 to 60%, preferably about 40 to 55% by weight, and best results are obtained with even the still narrower range of 45 to 50% by weight.

The copolymerization should be carried out at a temperature below −50° C., preferably below −80° C., such low temperatures being obtained by either internal or external refrigeration.

By thus restricting the proportions of reactants and the copolymerization temperature, high molecular weight copolymers are obtained which have an intrinsic viscosity above 0.5 and preferably 0.8 or 0.9 or higher. These copolymers are thermoplastic solids which have sufficient flexibility and toughness particularly in the heat-softened condition, to permit ready rolling out into thin sheets or films on suitable equipment such as the conventional calender used in rubber processing.

The copolymerization is effected by mixing the two reactants, with or without a mutual solvent, if necessary, such as ethylene, propane, butane, methyl chloride, refined naphtha, etc., and then after cooling the reactants to the desired low temperature, adding an active halide catalyst such as boron fluoride, or activated boron fluoride catalyst (.1% ether added), aluminum chloride, titanium tetrachloride, aluminum alkoxide-aluminum chloride complex-(AlCl$_3$.Al[OC$_2$H$_5$]$_3$ and the like. If desired, such catalyst may be dissolved in a solvent such as carbon disulfide, a low molecular weight sulfur-free saturated hydrocarbon, a lower alkyl halide, e. g., methyl chloride or ethyl chloride or a mixture of methyl chloride with butane, at or below the boiling point of the catalyst solvent, and then the catalyst solution cooled down, filtered and added to the reaction mixture. Alternative catalysts include:

AlCl$_3$.AlCl$_2$OH, AlBr$_3$.AlBr$_2$OH,
AlBr$_2$Cl.AlOCl, AlBrCl$_2$.AlOBr,
TiCl$_4$AlCl$_2$OH, TiOCl$_2$.TiCl$_4$, AlBr$_3$.Br$_2$.CS$_2$

AlBr$_3$, BF$_3$. isopropyl alcohol, BF$_3$ solution in ethylene, activated BF$_3$ catalyst in ethylene solution, activated BF$_3$ catalyst in methyl chloride solution. Volatile solvents or diluents, e. g., propane, ethane, ethylene, methyl chloride, carbon dioxide (liquid or solid), etc. may also serve as internal or external refrigerants to carry off the liberated heat of polymerization. After completion of the copolymerization, residual catalyst is killed with alcohol, for example, isopropyl and excess catalyst removed by washing the product with water and preferably also with dilute aqueous caustic soda. The resulting solid copolymer may range from a relatively stiff plastic mass to a hard tough thermoplastic solid, depending upon the temperature of polymerization, the yield of polymer obtained upon the active feed, the type and concentration of catalyst, the proportion of cyclic reactant in the feed, and the temperature at which the physical texture is observed.

The proportions in which the reactants, e. g., styrene and isobutylene, have actually combined during copolymerization may be determined by interpolation of a carbon-hydrogen analysis between the limits, for instance:

|  | Carbon | Hydrogen |
| --- | --- | --- |
|  | Per cent | Per cent |
| Pure styrene | 92.3 | 7.7 |
| Pure isobutylene | 85.7 | 14.3 |

For convenience and brevity the above-described copolymer of a cyclic polymerizable material and an olefin or alkene will be referred to as a cycalkene copolymer, or more simply a cycalkene. The specific type of copolymer made from styrene and isobutylene will similarly be referred to as simply stybutene. The invention will be illustrated as applied particularly to stybutene, although it is not to be limited specifically thereto.

Many resinous and plastic materials either occurring in nature or made synthetically heretofore are unsuitable for sheeting out into thin self-supporting films because they are either too brittle or have too much cold flow, etc., and furthermore, most of the plastics which can be successfully sheeted out into thin self-supporting films are unsatisfactory for the purpose of the present invention, either because they are not physically and chemically compatible with the synthetic rubber type of plastic intended to be wrapped, and therefore, could not be homogeneously milled into such material, or else because they themselves have too much cold flow and tackiness.

For preparing self-supporting films of stybutene for use as a wrapper according to this invention, the stybutene, having a high intrinsic viscosity as mentioned above, should be heated well above the softening point, for instance, to a temperature of about 100–180° C., preferably in a kneader type mixer to bring the entire mass to a uniform temperature and plasticity, and then it is sheeted out into a thin film by processing on a rubber calender. In this latter operation a three roll calender may be employed. The center roll is heated to about 220° F., the top roll is maintained at a temperature between 250° and 300° F. The bottom roll is maintained at a temperature of about 80° F. The film is stripped from the middle roll and allowed to cool on the bottom roll then subsequently rolled automatically on a mandrel. The sheet may then be slit or cut to size depending on the application requirements.

In preparing the stybutene film, one may add small amounts of other materials to the plastic mass before sheeting it out into film form, as for instance, small amounts of soluble coloring agents such as blue, red, yellow, green, or other colored dyes, preferably of the oil-soluble type, colorless, light absorbing substances such as quinine, aesculin, etc. to protect the synthetic rubber or plastic wrapped in the film from the harmful effect of sunlight, ultraviolet light, etc., during storage or shipment, or pigments or other powdered fillers may be added. Small amounts of plasticizers or calendering aids may be used, or other resinous or plastic materials which may be used to slightly modify the physical characteristics of the stybutene film without greatly affecting the chemical properties thereof or without adversely affecting its compatibility with the synthetic rubber or other plastic intended to be wrapped therein. Examples of such various additives, which may be used in proportions of 1 to 5% or more, include high molecular weight polybutene (preferably 30,000 to 300,000 molecular weight Staudinger), isobutylene-polyolefin low-temperature copolymers (preferably 30,000 to 150,000 molecular weight Staudinger), isobutylene-polyolefin-styrene tripolymers (preferably 10,000 to 100,000 molecular weight Staudinger), high molecular weight sulfurized alkylated phenol [HO(R)C$_6$H$_3$]$_2$S, paraffin wax, high melting point deoiled petrolatum, vegetable waxes, stearic acid, high molecular weight polymethylpentadiene (30,000 to 40,000 molecular weight Staudinger), high molecular weight polyethylene, de-proteinized and deashed or cyclized rubber, cyclized rubber, and aliphatic nitriles that contain 12 to 18 carbon atoms, zinc stearate, zinc oxide, sodium stearate, carbon black, etc.

After sheeting out the stybutene into a thin film by rolling, calendering, or any other suitable method, the resulting film which may be prepared in any desired thickness, but for the present invention preferably has a thickness of about .001 inch to .01 inch, or about 1 to 10 mils, and preferably about 2 to 4 mils is found to have a smooth surface, good strength, good flexibility, low permeability to moisture vapor and other gases, low cold flow and little or no surface tack.

In carrying out the invention, it is found that the actual amount of stybutene film necessary for wrapping the raw synthetic rubber or other plastic having cold-flowing tendencies, is relatively very small, ranging for instance, from about 1 to 25 pounds, preferably about 2 to 10 pounds per ton of synthetic rubber, the latter preferably being packaged in chunks weighing about 25 to 100 pounds, preferably about 50 pounds each. If chunks of raw synthetic rubber weighing about 50 pounds each are wrapped with a stybutene film having a thickness of about 2 mils, the total amount of stybutene required for the wrapping will be about 4 pounds per ton of rubber, which amounts to about 0.2% of stybutene by weight. Thinner films can be used with smaller weights of synthetic rubber, and conversely thicker films should be used with relatively larger packages of synthetic rubber or other plastic.

Although for some purposes such as short time storage and transportation over short distances or requiring only a short time, the plastic having cold-flowing tendencies and wrapped up in the thin film of stybutene or other cycalkene copolymer having requisite tensile strength, toughness and non-tackiness, may be used as such i. e., without being placed in any outer container or wrapped in outer wrapping material, it is preferred to use an outer container such as a corrugated paper carton, paper or cloth bag, large tin cans, drums, etc., or for some purposes where the packages are less subject to mechanical injury from bumping solid objects etc., it may be sufficient to cover the stybutene-wrapped synthetic rubber or other plastic with ordinary heavy wrapping paper, such as the kraft paper commonly used for wrapping purposes, such wrapping being chiefly for the purpose of keeping the inner package clean.

Instead of using a non-tacky stybutene or other cycalkene copolymer as wrapping film, other thin, non-tacky, flexible, tough and self-sustaining, non-metallic sheet material may be used, especially hydrocarbon polymers of the aliphatic type, e. g., polyethylene, polyisobutylene having a mol. weight of above about 200,000 (Staudinger method), non-tacky synthetic rubbers, polyacrylates, polyvinyl alcohol, plasticized polystyrene, etc. These latter three types of material are not well suited for wrapping GRI rubber because not compatible therewith, but may be used for wrapping tacky materials that are compatible therewith.

Although the invention has been described above as particularly applied to the wrapping and packaging of a raw synthetic rubber particularly of the copolymerized isobutylenediolefin type, it may also be applied to other tacky plastics having cold-flowing characteristics such as gelatin, asphalt, polyglycols, some of the polyacrylic esters, tacky unsaturated synthetic rubbers, polybutene having an average molecular weight between the approximate limits of 20,000 to 200,000 by the Staudinger method, or other high polymeric compounds comprising isobutylene, such as copolymers of isobutylene and ethylene, copolymers of styrene and isobutylene of low styrene content and sufficiently low molecular weight to be tacky and have cold-flowing properties, such as those having a styrene content of less than about 30% and having an intrinsic viscosity of about 0.1 to about 0.4, with an average molecular weight of about 3,000 to 30,000.

The following table will illustrate a number of suitable combinations of various tacky cold-flowing plastics and various wrappers compatible therewith upon subsequent hot mixing:

| Non-tacky Film | Plastic Material Packaged | | | | | | |
|---|---|---|---|---|---|---|---|
| | Butyl Rubber | Polyisobutylene | Poly Methyl Acrylate | Poly Glycols | Gelatin | Buna S | Asphalt |
| Stybutene | Yes | Yes | Yes | No | No | Yes | Yes. |
| Polyethylene | Yes | Yes | No | No | No | Yes | Yes. |
| Polyisobutylene [1] | Yes | Yes | No | No | No | Yes | Yes. |
| Acrylate Films | No | No | Yes | No | No | No | No. |
| Polyvinyl alcohol | No | No | No | Yes | Yes | No | No. |
| Polystyrene | No | No | No | No | No | No | Yes. |
| Polybutadiene [1] | Yes | Yes | | | | Yes | Yes. |
| Buna S [2] | Yes | Yes | | | | Yes | Yes. |

[1] Having molecular weight above about 200,000 (Staudinger method).
[2] Having Mooney viscosities greater than about 80.

It will be noted that in all of these cases the stybutene or other cycalkene copolymer or other non-tacky film used as wrapper is at least physically compatible with the tacky plastic wrapped so that it may be homogeneously admixed therewith by simple milling or kneading at heat softening temperature, and in most cases, such wrapper is sufficiently closely related from a chemical point of view that it will have no adverse affect on the chemical properties of the wrapped plastic, and in some instances, may even effect a slight improvement in physical or chemical properties thereof, e. g., by reducing moisture vapor penetration, etc.

Figure 2:
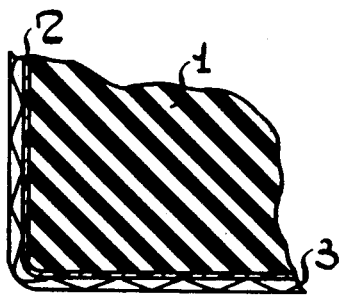
Figure 3:
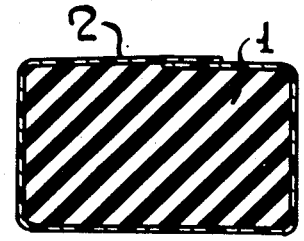

The invention is illustrated in the accompanying drawing in which Figure 1 represents a perspective view of an open corrugated paper carton containing a large chunk of plastic such as raw synthetic rubber of the low-temperature isobutylene-diolefin copolymer type wrapped, except for the open top, in a thin sheet or film of stybutene copolymer, the Figure 2 shows an enlarged section of one of the lower corners of the package shown in Figure 1, and Figure 3 is a cross section of a package of plastic such as synthetic rubber merely wrapped in a thin film of stybutene without any outer container or wrapper. In the several figures, like reference numerals represent like parts.

Referring to Figure 1 of the drawing, a large piece or chunk of tacky plastic 1, e. g., raw synthetic rubber of the GRI type is shown as wrapped in a thin film of cycalkene copolymer 2, the top of the package being illustrated open for convenient understanding of the invention, the wrapped tacky plastic being shown as placed in an outer container 3 such as a corrugated paper carton, also shown open to permit seeing the contents thereof. It is understood, of course, that for storage and shipment, the upper flaps of the wrapper 2 will be folded down over the surface of the plastic 1, and then the lids of the carton 3 will be closed in the conventional manner.

In Figure 2, which represents a much enlarged vertical section through one of the lower corners of the package shown in Figure 1, the plastic 1 is shown as tightly pressing against the surrounding thin film or sheet of cycalkene copolymer 2, which in turn presses tightly on the bottom of the outer container 3 e. g., a corrugated carton. The plastic 1 and surrounding wrapper 2 may or may not press tightly against the side walls and in the bottom corners of the container 3 when first packaged, although during storage and during shipment when the package is subjected to substantial vibration, the plastic 1 tends to flow into the bottom corners and against the side walls of the container 3, thereby stretching the thin, tough, but slightly elastic film 2. However, it is found that even after shipment or after substantial storage, when the container 3 is opened for removing its contents, the plastic 1 surrounded by its wrapper 2 will not substantially adhere to the inner surface of the container 3, and can readily be removed without difficulty and in a clean condition.

Figure 3 is a vertical section of a package similar to that shown in Figure 1 except that the plastic 1 is shown merely wrapped in a thin film of a cycalkene copolymer 2 without any outer container such as shown in Figures 1 and 2.

The advantages of the invention will be better understood from a consideration of the following specific examples.

Example 1

A 50 pound sample of GRI raw synthetic rubber which had been causing great difficulty by sticking to paper bags and cardboard boxes during shipment, was wrapped in a film having a thickness of about two mils of a stybutene having a combined styrene content of about 60%, and an intrinsic viscosity of about 0.75, which had been made by copolymerizing styrene and isobutylene at $-103°$ C., using as catalyst a 0.5% by weight solution of $AlCl_3$ in methyl chloride, and using 3 volumes of $CH_3Cl$ as diluent per volume of mixed reactants, and the resulting stybutene-wrapped raw synthetic rubber was placed in a 50 pound corrugated carton, and shipped by railway express over a distance of about 3,000 miles. At the end of the trip, the container was opened and when held upside down, the stybutene-wrapped rubber fell out of the box, thus showing that the stybutene wrapper satisfactorily prevented the GRI rubber from sticking to the corrugated paper carton.

However, when the stybutene-wrapped rubber was milled in order to mix the stybutene into the rubber, the temperature of the rolls had to be raised to about 180° F. in order to obtain homogeneous mixing, and this temperature is slightly higher than desirable, thus indicating that a stybutene of 60% styrene content is just about at the upper limit of the suitable range of styrene content for compatibility, and that better results would be obtained with slightly lower styrene content.

Example 2

A similar test was made with a stybutene having a combined styrene content of 50% and prepared under substantially identical copolymerization conditions, and this film was found to be satisfactory both in regard to preventing the GRI rubber from sticking to the inside of paper cartons as well as to iron cans, and also was compatible with the GRI and gave a homogeneous mixing at the usual milling temperature of about 130° F.

Example 3

Another test was made similar to Example 2, except that a stybutene was used which had a combined styrene content of about 45% and which contained about 2% of zinc stearate as a plasticizing agent or milling aid to prevent sticking of the film to the heated rolls during the sheeting of the film. This stybutene film having a thickness of about 2 to 3 mils was found very satisfactory in preventing a GRI raw synthetic rubber from sticking to corrugated paper cartons during shipment, and was also found to be readily compatible with the GRI at ordinary mixing temperature, i. e., about 110 to 140° F. The compatibility was determined by mixing 5% of Easy Processing Channel carbon black with the stybutene to give the latter a distinctive color for tracing the stybutene while dispersing it in the GRI rubber. Then 150 gms. of the GRI rubber were placed on a cold tight mill with a roll temperature of about 130° F., and 3 gms. of the blackened stybutene were milled in to the GRI rubber. After cutting from each side of the mill four times, the dispersion was complete and no flakes of stybutene were in evidence in the synthetic rubber.

Example 4

Another packaging and mixing test was made by using as a wrapper a film having a thickness of about two mils made of a mixture of 75% of a stybutene having a combined styrene content of about 60% and containing 2% of zinc stearate, with about 25% by weight of a polybutene having an average molecular weight of about 260,000. About 5% by weight of Easy Processing Channel carbon black was also used for imparting a distinctive color to the stybutene film. This mixture of stybutene and polybutene was readily calendered into a smooth self-supporting film and was found to be satisfactory for preventing the raw GRI synthetic rubber from sticking to paper carton containers and was also found readily compatible with the GRI when mixed at an ordinary milling temperature of 110° F.

Instead of actually wrapping the raw synthetic rubber or other cold-flowing plastic in the stybutene or other film and then placing the resulting package in an outer cardboard, paper, cloth, wood or metal container, the stybutene film can first be placed in the empty container and then the cold-flowing plastic can be inserted.

Although it is preferred to use films, it is possible to apply the coating to the plastic material to be packaged, in other ways. This is especially true when the plastic packaged is in the form of a bale or block which is the shape of the package to be used. Alternate methods of applying the exterior coating include application of a solution of the stybutene or other protective film by spraying, brushing or dipping followed by an evaporation of the solvent. Instead of a solution of the stybutene an aqueous dispersion thereof can be used and applied in a like manner. When using solution or aqueous dispersion, fillers may also be used such as zinc stearate, carbon black, etc.

It is not intended that this invention be limited to the specific examples or modifications which have been described merely for the sake of illustration, but only by the appended claims in which it is intended to claim all novelty inherent in the invention, as well as all modifications coming within the scope and spirit of the invention.

What is claimed is:

1. The method of packaging a low-temperature isobutylene-diolefin copolymer having tacky, cold-flowing characteristics, which comprises wrapping it in a thin, flexible, continuous, self-sustaining film of a styrene-isobutylene copolymer having an intrinsic viscosity greater than 0.5 and having a combined styrene content of about 40 to 60% by weight.

2. The method of packaging a raw synthetic rubber of the low-temperature isobutylene-diolefin type having a Mooney number of about 10 to 50, which comprises wrapping it in a thin, continuous self-sustaining film of a styrene-isobutylene copolymer having an intrinsic viscosity greater than 0.5 and having a combined styrene content of about 40 to 60% by weight, and placing the synthetic rubber wrapped with styrene-isobutylene copolymer in a paper carton for shipment or storage.

3. A package comprising a substantially rigid container, substantially filled with unvulcanized rubber of the low-temperature isobutylene-isoprene type having a Mooney number of about 10 to 50 and having an iodine number of about 2 to 20, said synthetic rubber being separated from said container by a thin film of about 1 to 10 mils in thickness of a styrene-isobutylene copolymer having an intrinsic viscosity greater than 0.5 and having a combined styrene of about 40 to 60% by weight.

4. A package comprising a bag made of fibrous sheet material containing therein a substantial volume of an unvulcanized synthetic rubber of the low-temperature isobutylene-diolefin type having a Mooney number of about 10 to 50 and having an iodine number of about 2 to 20, said synthetic rubber being separated from said bag by a thin film of about 1 to 10 mils in thickness of a styrene-isobutylene copolymer having an intrinsic viscosity greater than 0.5 and having a combined styrene content of about 40 to 60% by weight.

5. A package comprising unvulcanized synthetic rubber of the low-temperature isobutylene-diolefin type having a Mooney number of about 10 to 50, wrapped in a film of about 1 to 10 mils in thickness of a styrene-isobutylene copolymer having an intrinsic viscosity greater than 0.5 and having a combined styrene content of about 40 to 60% by weight.

WILLIAM J. SPARKS.
FRANCIS P. BALDWIN.
RAYMOND G. NEWBERG.

REFERENCES CITED

The following references are of record in the file of this patent:

UNITED STATES PATENTS

| Number | Name | Date |
| --- | --- | --- |
| 931,350 | Thoma | Aug. 17, 1909 |
| 2,023,068 | Flood | Dec. 3, 1935 |
| 2,077,301 | Abrams et al. | Apr. 13, 1937 |
| 2,213,423 | Wiezevich | Sept. 3, 1940 |
| 2,274,749 | Smyers | Mar. 3, 1942 |
| 2,287,849 | Wilson | June 30, 1942 |
| 2,310,712 | Schmied | Feb. 9, 1943 |
| 2,330,353 | Henderson | Sept. 28, 1943 |
| 2,332,048 | Nadeau et al. | June 15, 1943 |
| 2,394,616 | Knoth | Feb. 12, 1946 |
| 2,394,936 | Palmer | Feb. 12, 1946 |
| 2,396,633 | Bernstein | Mar. 19, 1946 |
| 2,403,964 | Bannon | July 16, 1946 |